(12) United States Patent
Desreumaux et al.

(10) Patent No.: US 10,677,074 B2
(45) Date of Patent: Jun. 9, 2020

(54) METHOD FOR CARRYING OUT WORK ON A ROTOR AND ASSOCIATED FOIL

(71) Applicant: Safran Aircraft Engines, Paris (FR)

(72) Inventors: Antoine Patrice Marie Desreumaux, Moissy-Cramayel (FR); Patrick Jean-Louis Reghezza, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 333 days.

(21) Appl. No.: 15/518,718

(22) PCT Filed: Oct. 12, 2015

(86) PCT No.: PCT/FR2015/052746
§ 371 (c)(1),
(2) Date: Apr. 12, 2017

(87) PCT Pub. No.: WO2016/059338
PCT Pub. Date: Apr. 21, 2016

(65) Prior Publication Data
US 2017/0234148 A1    Aug. 17, 2017

(30) Foreign Application Priority Data
Oct. 13, 2014   (FR) ..................... 14 59798

(51) Int. Cl.
*F01D 5/30*    (2006.01)
*F01D 5/00*    (2006.01)

(52) U.S. Cl.
CPC ........... *F01D 5/3038* (2013.01); *F01D 5/005* (2013.01); *F05D 2230/80* (2013.01); *Y02T 50/672* (2013.01)

(58) Field of Classification Search
CPC .......... F01D 5/3038; F01D 5/005; F01D 5/30; F01D 5/3053; F01D 5/066; F01D 5/3092; F01D 5/28; F01D 5/3007; F01D 25/007; F01D 25/243; F05D 2230/80; B23P 6/002; F02B 77/04; F04D 29/322; F16D 1/033; F16D 1/06; F16D 2001/062
See application file for complete search history.

(56) References Cited

U.S. PATENT DOCUMENTS 4,980,241 A * 12/1990 Hoffmueller ........... F01D 5/066
                                                       277/345
6,431,835 B1 * 8/2002 Kolodziej ................. F01D 5/28
                                                       416/219 R (Continued)

FOREIGN PATENT DOCUMENTS

| EP | 0 341 455 A2 | 11/1989 |
| EP | 2 642 074 A1 | 9/2013 |
| EP | 2 762 681 A2 | 8/2014 |

*Primary Examiner* — George C Jin
(74) *Attorney, Agent, or Firm* — Blank Rome LLP

(57) ABSTRACT

In the method for carrying out work, according to the invention, in order to maintain a metal turbine engine motor, such as a drum, in an operational state:
an upstream and/or downstream face (343) of a circumferential groove (34) of the rotor is ground, with said face having recessed marks that the grinding is intended to remove or at least blur,
and foils (43) are placed in the groove between the blades of the rotor (24) and the rotor, at least in the area where the face has been ground.

9 Claims, 2 Drawing Sheets

(56) References Cited

U.S. PATENT DOCUMENTS

| | | | | |
|---|---|---|---|---|
| 7,938,626 | B2* | 5/2011 | Forgue | F04D 29/322 |
| | | | | 416/220 R |
| 8,535,011 | B2* | 9/2013 | Mace | F01D 5/3007 |
| | | | | 416/204 A |
| 9,062,553 | B2* | 6/2015 | Baumas | F01D 9/042 |
| 2007/0297908 | A1 | 12/2007 | Barber | |
| 2011/0255980 | A1* | 10/2011 | Heinzelmaier | F01D 5/005 |
| | | | | 416/204 R |
| 2013/0074336 | A1* | 3/2013 | Wellenkamp | F01D 5/005 |
| | | | | 29/889.1 |

\* cited by examiner

METHOD FOR CARRYING OUT WORK ON A ROTOR AND ASSOCIATED FOIL

The invention relates to a method for carrying out work to maintain the rotor of an a priori aircraft turbomachine, such as a low-pressure compressor drum in an operational state.

The invention also relates to the foils which will be provided on the blades of such rotor and an assembly comprising the blade and the foil provided thereon and surrounding the root thereof, from below.

The preferred turbomachine is an aircraft turboengine. And, in the present application, an axial direction is defined as a direction parallel to the axis of rotation of the fan. Besides, the upstream and downstream of a part are defined relative to the normal direction of the gas flow within the turboengine. And a radial direction is perpendicular to the axial direction mentioned above, with the terms "inner" and "outer" meaning radially closer to and further from said axis of rotation, respectively.

Moreover, the rotor considered here:
rotates about a central axis globally parallel to which can flow from upstream to downstream between the blades of such rotor, at least one gaseous fluid stream.
and the outer periphery of which has at least one circumferential groove, wherein said blades to be rotated about said central axis by said rotor are arranged and retained between an upstream face and a downstream face in an upright position at the groove boundary, with at least one of said upstream and downstream faces having recessed marks opposite at least one of the blades.

Now, upon rotation of the rotor under consideration, each blade axially moves back and forth inside its housing and repeatedly hits the faces in an upright position at the groove boundary where it is positioned. The repeated hitting of the blades against the faces opposite the groove causes damage thereto and reduces the service life of the rotor. Prints (the recessed marks mentioned above) which are cracks starting areas, if only potential ones, can generally be found in the groove(s). Such phenomenon is particularly annoying since rotors, including drums, are relatively expensive parts, and the replacement thereof takes time.

As a matter of fact, especially on drums, such non-compliances during maintenance operations may lead to scrap parts as they are now beyond repair.

An object of the present invention is to provide a relevant solution to avoid the systematic and premature replacement of the concerned parts, since wear which causes the replacement thereof can typically be observed from half the service life of the part on.

As an alternative solution, locally removing material by abrasion (also called "blending") of wear in the seating face has been considered, but this solution requires a modification of clearances at the top of the blades and would not make it possible to prevent such seating faces from wearing.

Another solution consisted in using foils, which are supposed to be "anti-wear" parts inserted between the blade roots and the rotor. However, each foil continues to move and repeatedly hit the faces in an upright position at the groove boundary where it is located, including in document FR2890684 wherein the lugs tend to unfold because of the thrust exerted thereon by the blade root. Once unfolded, said lugs no longer act as stops, so that the foil is no longer held.

The invention aims at avoiding such inappropriate situations. Against the prejudices which consider repair works aiming at restoring the interfaces as inadequate, because time consuming and requiring significant work (disassembly/reassembly) and involving a structural weakening affecting the reliability and the subsequent holding of the blades, the invention nevertheless provides for:

with the groove having a radial neck for retaining the blades defined between rims, grinding said face(s) which has/have recessed marks at some distance from the neck so as to erase or at least blur at least some of such recessed marks, with one of said rims being interrupted by a notch for introducing the blades into the groove, reworking the notch through which the blades are then introduced with their foils, and then placing foils in the groove, between the blades and the rotor, at least in the area where the face has been ground.

The geometry of the seating faces of the grooves or cells worn beyond the service criteria will thus be restored. The proposed repairing solution will restore the geometry of the seating face of the groove concerned.

It should also be noted that in practice, specifically on a drum, if it had been desired to place a ring (or an anti-wear strip) to compensate for the machining rework, inserting or holding it on the seating faces would have been a problem.

Besides, contrary to what the inventors expected, it also proved that it was better to carry out work on a global rather than local scale. Thus, it is recommended:

that said face which has the recessed marks should be ground on at least the main portion of its circumference, and that foils should be placed in the groove, between all the blades and the rotor.

This will prevent mixing a blade without a foil with a reworked groove, which would increase the clearance of the blade in its groove, without enabling the ejection of the blade, however.

In addition, and in practice, mounting a blade with a foil in a rotor/drum if it has not been mechanically reworked will be impossible.

After the machining rework of the cells seating faces required for eliminating wear, the volumes of working material when the blades are centrifuged are reduced. However, by providing that the removal of material will be such that the neck of the groove, which is the minimum section of material shall not be reduced, a minor increase in the constraints, which will not affect the service life of the rotor/drum shall thus remain only. The calculations made show and prove that multiplying the contact surfaces reduces the contact pressure and increases the service life of the part while limiting wear. The contact surfaces are those of blade seating faces relative to the foils and those of foil seating faces relative to the cells.

And to secure the various positioning operations and the overall reliability of the work carried out, it is even advised to adapt the dimensions of the foils and the groove so that:

prior to grinding, a blade cannot be positioned in the groove and one of said foils cannot be placed between said blade and the rotor, whereas such positioning and placing are allowed after grinding.

In the same way, it is recommended that the upstream and downstream faces at the groove boundary should be symmetrically ground and foils should be placed in the groove, between all the blades and the rotor.

For the desired correction, one or more machining passes with a form cutter will preferably be performed over a depth of less than or equal to the thickness of the foil and ranging from 0.1 to 0.3 mm. At least 0.2 mm is a priori advantageous, this being above usually observed wear (0.1 mm). Rework machining could be a 0.3 mm material removal.

Turning now to the foil itself, it will advantageously be made of elastically deformable material and include, on the same face:
- a central connecting portion of the first and second upright side branches, so that said central part can be positioned under the blade root concerned and the first and second side branches opposite an upstream face and a downstream face of said root,
- a third transverse branch, positioned upright along a portion of a first edge of the foil which extends between the first and second side branches so as to be positioned opposite a third transverse face of said root which extends between the upstream and downstream faces of this root,
- and one or more protrusions or hooks located towards a second edge of the foil which extends between the first and second side branches, opposite the first edge, to enable:
  - the sliding of said central connecting portion under the blade root, substantially up to the third side branch abutting against said third transverse face of the root, after the resiliently forced passage over the protrusion(s),
  - and some holding of said foil in this position after the resilient return of the protrusion(s) or hook(s) opposite a fourth transverse surface of said root opposite the third transverse face.

The design of the foil will thus integrate the axial (side branches), radial (over 90° folds as shown) and transverse (transverse branch and protrusion(s) locking, so it cannot be lost, either in operation or when it is centrifuged or during the mounting.

The invention also relates to an assembly comprising:
- a turbomachine rotor rotating about a central axis, and the outer periphery of which has at least one circumferential groove wherein said blades to be rotated about said central axis by said rotor are arranged and retained between an upstream face and a downstream face in an upright position at the groove boundary, with at least one of said upstream and downstream faces being ground so as to have blurred recessed marks presenting recess marks, with each blade having a root through which the blade is maintained in the groove,
- and at least one foil of the aforementioned type.

Preferably, each foil will be made of sheet metal, typically Inconel, and have a thickness which may be 0.3 mm, thus sufficiently elastic to fit the shape of the root and of the groove.

Such foils will then provide a greater resistance to wear than titanium and will make it possible to produce low thickness parts rigid enough to withstand the stresses of matting at the blade/seating face interface. They will also offer the possibility of adding a lubricating varnish on the seating faces of the foils, with such varnish improving the conditions of contact between the blade and the seating surface thereof, with such contact conditioning the service life of the rotor/drum.

The first, second and third upright branches of the foils may each be connected to the central connecting part by a fold.

The invention should be better understood, and other details, characteristics and advantages of the invention will appear upon reading the following description given by way of a non-restrictive example while referring to the appended drawings wherein.

Figure 1:
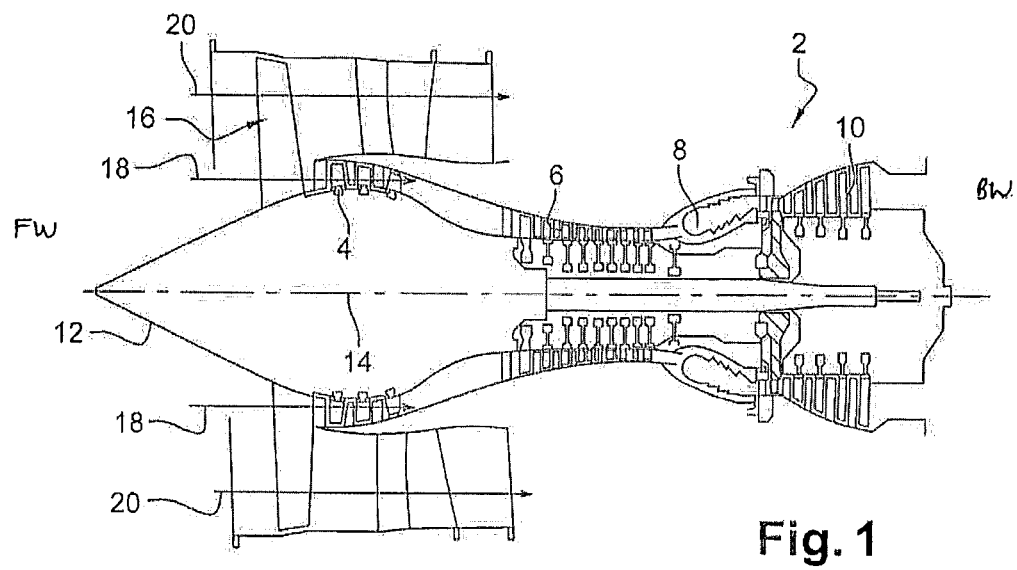
FIG. 1 shows a diagram of a known turbine engine, in axial section.
Figure 2:
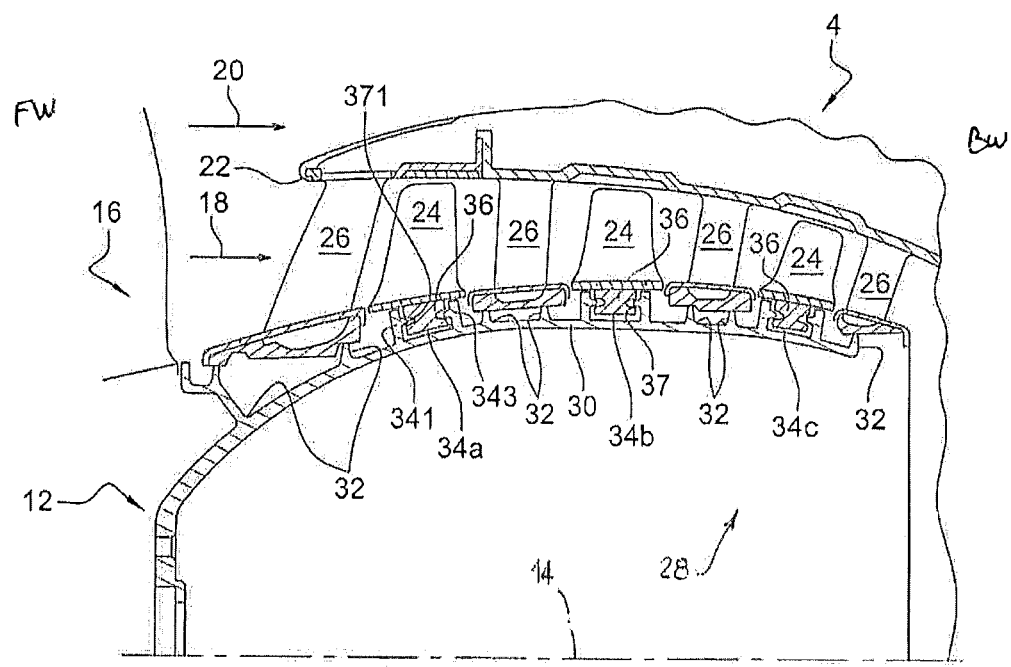
FIG. 2 is again a diagram in axial section, but locally only, of a portion of the low-pressure compressor drum 4.

Before specifically going back to the invention, FIGS. 1 and 2 thus show the environment thereof, according to a known state of the art from document EP2762681, when the rotor, damaged and therefore to be ground, is a low-pressure compressor drum.

As a matter of fact, the invention applies, within specified limits, to another rotor carrying blades of a low-pressure compressor drum; however, such a part is specific, because of its position in the engine, its mass, its volume, and thus, the constraints implied to it.

FIG. 1 shows a double flow turboengine 2. The turboengine 2 axially comprises from upstream (AM) to downstream (AV), in a sequence, a low-pressure compressor 4, a high-pressure compressor 6, a combustion chamber 8 and one or more turbine stage(s) 10. In operation, the mechanical power of the turbine 10 transmitted via the central shaft to the rotor 12 moves the two compressors 4 and 6. The rotation of the rotor 12 about its rotational axis 14 makes it possible to generate an air flow and to progressively compress the latter up to the inlet of the combustion chamber 10. An intake fan (fan) 16 is coupled to the rotor 12 and generates an air flow which is divided into a primary flow 18 circulating through the various levels mentioned above of the turbomachine, and a secondary flow 20 circulating through a (partially shown) annular channel along the machine prior to joining the primary flow at the turbine outlet The low-pressure compressor 4 illustrated in FIG. 2 shows a portion of the fan 16 and the separation nozzle 22 of the primary 18 and secondary 20 flows. The rotor 12 comprises a plurality of circumferential rows of rotor blades 24 and a plurality of stator stages, each containing a row of stator blades 26. The stator stages are associated with the fan 16 or a row of rotor blades 24 so as to redirect the air flow. The rotor blades 24 extend substantially radially from the rotor 12.

The rotor 12 includes a drum 28. The drum 28 has a wall 30 with a profile of revolution around the axis of rotation 14, somewhat like a potbellied cylinder. The profile of revolution of the wall 30 radially follows the varying section of the inner surface of the primary flow.

The drum 28 may comprise strips 32 typically designed to cooperate by abrasion with annular layers of abradable material so as to provide sealing.

Besides, the drum 28, which is here made of metal, rotates about the central axis 14 globally parallel to which can flow from upstream to downstream between the blades 24 of a same row, the considered gaseous fluid stream.

And the outer periphery thereof has, opposite each row of rotor blades 24, a circumferential groove which extends around the axis 14 and referenced 34a, 34b or 34c, according to the row of interest in FIG. 2.

In each circumferential groove the rotor blades 24 of one of the series are arranged and retained between an upstream face (or inner wall) and a downstream face (or inner wall) (such as 341 and 343 respectively for the groove 34a) in an upright position at the groove boundary.

For this purpose, each blade 24 has a root 36 having an upstream face 361 and a downstream face 363 (FIG. 4) respectively facing the upstream and downstream faces 341 and 343 of the relevant groove (FIG. 2). And the upstream 361 and downstream 363 faces each have a recess, respectively 361a and 363a in FIG. 5, wherein respective circumferential upstream and downstream 371, 373 (FIGS. 2, 4) rims of the walls 341 and 343 are engaged.

Figure 4:
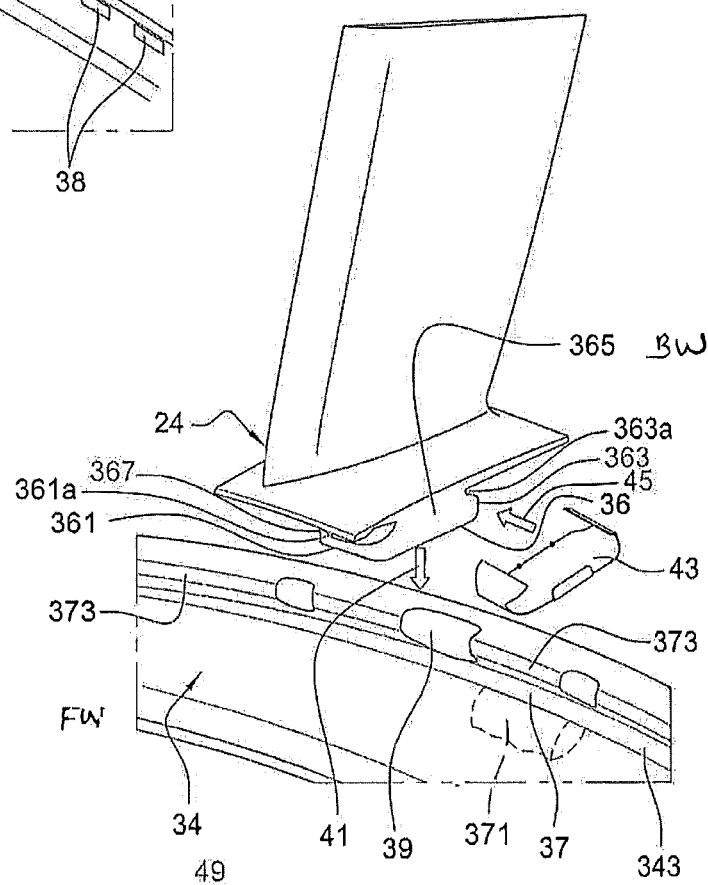
FIG. 4 shows the same portion of the groove, when ground, with a blade and a foil to be placed therein.

FIG. 4 further shows that, on its circumference, the rim considered, here 373, is interrupted at at least one location (such as 39) to enable each blade root to substantially radially go therethrough so as to be engaged into the groove (arrow 41), after which the blade 24 is slided in its sector in the groove. When positioned, the blades are radially retained by the narrow neck 37 between the rims 371, 373.

Figure 3:
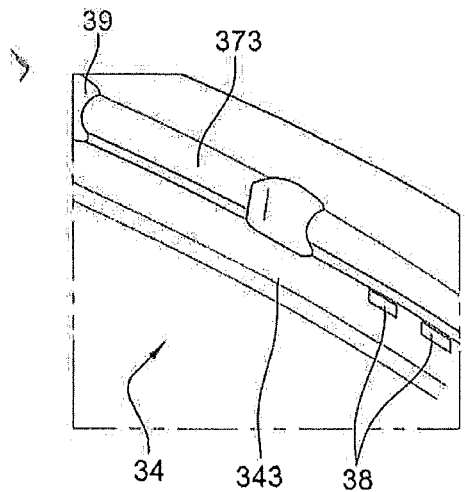
FIG. 3 is a detail of a portion of the downstream boundary wall of one of the grooves in the drum.

As already explained, a problem rises in that, when the compressor operates, the substantially axial movement, though limited, of the positioned blades 24 induces, opposite at least some of these blades, recessed marks in at least some of the inner walls 341 and 343 of at least some of the circumferential grooves, such as marks 38 in the wall 343 FIG. 3.

To overcome this drawback, the invention thus provides for:
  on the one hand, grinding the face that has these recessed marks 38, so as to remove or at least blur at least some of these wear marks,
  and on the other hand, placing foils 43 in the groove 34, between the blades roots 36 and the inner walls 341, 343 at least in the area where the face has been ground.

FIG. 4 shows that the marks 38 have disappeared. Assuming that the pressure faces 341, 343 (also called seating faces) have such marks, grinding has been carried out by annular machining, on these faces.

As regards this issue, it is even recommended to symmetrically grind such inner walls 341, 343 at the groove boundary and to intervene so that foils 43 are placed between all the blades and said walls of the concerned groove.

The machining of the grooves in the drum could specifically be carried out using a form cutter, which is a tool of the same type as the one used during the initial manufacturing of the compressor drum 28, which will typically be titanium-based.

Each face having recessed marks will thus be ground on most of its circumference, with the mechanical machining rework being at least sectorial and preferably substantially annular, on the inner sides of the flank seating faces mentioned above.

Upon completion of the above, foils 43 will preferably be provided on all the blades 24 at least of the considered series, as schematically shown by the arrow 45 in FIG. 4, prior to engaging the assembly into the relevant groove.

Meanwhile, the notch 39 will a priori be reworked for the insertion of the blades, in order to take account of the presence of the foil 43 which is presented in greater details hereafter.

The optimized geometry of groove seating faces will thus be restored and the clearance between the roots of the mobile blades and the seating faces of the drum groove will thus be compensated for.

Two other important points have been considered: the control of the increase in stress in the groove(s), further to the reworking and the mounting and interchangeability of the equipped drum.

As regards the first point, after reworking said groove seating faces, as required for eliminating the wear marks, the volumes of working material when the blades are spun 24 are reduced. However, the removal of material has been so designed that the neck 37, which is the minimum section of material, is not reduced. As a matter of fact, calculations show a low increase in the constraints which does not affect the service life of the drum 28.

As regards the second point, in order to avoid mixing a blade 24 without a foil with a reworked groove 34 (which would increase the clearance of the blade in its groove, without enabling the ejection of the blade), marking can be added on the drum so as to indicate to the operator that a foil must be placed on all the drum blades. And thus, it will not be possible to mount a blade with a foil in a drum without it having been mechanically reworked.

Thus, it will be advised to grind the face(s) which has (have) the recessed marks at a distance from said neck 37.

And it is also recommended to adjust the relative sizes of the foils and of the groove so that:
  prior to grinding, a blade root 36 provided with its foil 43 cannot be positioned in the raw groove 34 (FIG. 3)
  whereas such placing will be possible after grinding (FIG. 4).

Figure 5:
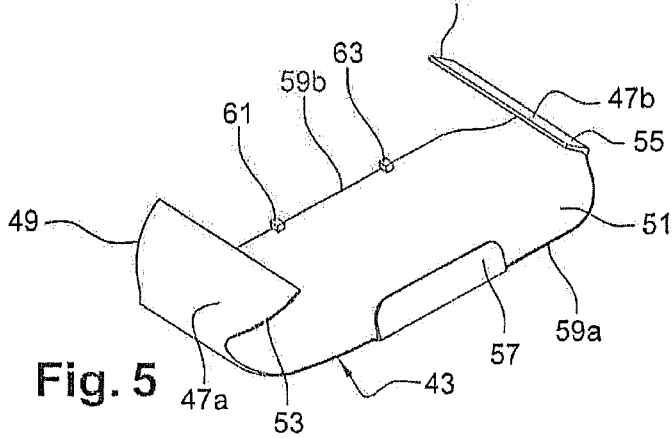
FIG. 5 shows the foil alone.

FIG. 5 shows more clearly than FIG. 4 the foil 43, the use of which is preferred for the root (provided that the present method for carrying out work could be applied to other forms of blade roots).

The foil 43 is a plate made of a relatively resiliently deformable material. Rather than composite (for instance Vespel; registered trademark), the material used will preferably be an Inconel which provides a greater wear resistance than titanium and makes it possible to produce low thickness foils rigid enough to withstand the stresses of matting at the blade/seating face interface in the groove. It also offers the possibility of adding a lubricating surface varnish on the side seating faces 47a, 47b of the foil, with such varnish improving the conditions of contact between the blade and the seating surface thereof, with such contact conditioning the service life of the drum. The lubricating surface varnish 49 can be molybdenum disulfide, such as the one currently laid on the fan blades, or a product providing similar characteristics and meeting the new so-called "REACH" standards.

The foil 43 comprises, on the same face (the radially outer face):
  a central part 51 connecting the first and second upright side branches 53, 55, so that said central part can be positioned under the blade root 45 and the first and second side branches respectively opposite the upstream 361 and downstream 363 faces of said root,
  a third transverse branch 57, positioned upright along a portion of a first edge 59a of the foil which extends between the first and second side branches 53, 55 so as to be positioned opposite of a third transverse face 365 of said root which thus extends between the upstream and downstream faces 361, 363 of this root,
  and one or more (here two) protrusion(s), seam(s) or hook(s) 61, 63 located towards a second (transverse) edge 59b of the foil which extends between the first and second side branches 53, 55, opposite the first edge 59a.

Such foil will then enable:
  the sliding thereof (arrow 45) so that the central portion 51 comes under the blade root 36, substantially up to the third side branch 57 abutting against said third transverse face 365 of the root, after the resiliently forced passage over the protrusion(s) 61, 63, some holding of said foil in this position after the resilient return of the protrusion(s) or hook(s) 61, 63 opposite a fourth transverse surface of said root (hidden face 367 in FIG. 4) opposite the third face 365.

and the positioning of such foil under the root 36 of the blade with it in the groove, in order to help keeping it in position, in the groove.

The first, second and third upright branches 53, 55, 57 will preferably be each connected to the central connecting part 51 by a fold to combine strength, flexibility, ease of manufacture.

Generally speaking, in terms of benefits of the solution presented hereinabove, the list can be as follows:

restoration of the contact surface: unlike the known canvas coating, the foil makes it possible to restore a contact surface complying with the certification requirements. The distribution of stress through the seating faces of the groove thus occurs evenly;

no change in the clearance at the top of the blade: restoring the geometry of the drum/blades (wheels) assembly makes it possible to keep the optimal clearance at the top of the blade, with such clearance affecting the engine performances and the mechanical behaviour of the blades;

significant covered wear depth: the depths of wear marks typically observed do not exceed 0.1 mm. The above-mentioned repair covers all wear marks up to 0.2 mm, even 0.3 mm;

reduced wear rate: the material used with additional varnish application makes it possible to reduce the wear rate of the drum seating faces;

balancing: no unbalance created if the mechanical rework is symmetrical and all the blades are equipped with foils;

easily replacement: if wear appears on a foil, the latter is easily disassembled and replaced;

so-called "Murphy" security (Murphy proof): provided stage by stage and between the stages, and the design of each foil avoids mounting in a direction contrary to the design position;

financial aspect: the price of a new drum is high, not including the loss due to the time required for the repair works and the engine down time. As the foil is a standard part and mechanical rework a joint repair operation, the cost of repair will be very low as compared to the complete replacement of the drum.

The invention claimed is:

1. A method for carrying out work in order to maintain in an operational state a rotor of a turbomachine:
   rotating about a central axis generally parallel to which can flow from upstream to downstream between blades, at least one gaseous fluid stream,
   and the outer periphery of which has at least one circumferential groove, wherein said blades to be rotated about said central axis by said rotor are placed and retained between an upstream face and a downstream face in an upright position at the groove boundary, with at least one of said upstream and downstream faces having recessed marks opposite at least one of the blades, wherein:
   as the groove has a radial neck for retaining the blades, the neck being defined between rims, said upstream face and/or downstream face which has/have recessed marks is/are ground at some distance from the neck so as to erase or at least blur at least some of such recessed marks,
   as one of said rims is interrupted by a notch for introducing the blades into the groove, the notch through which the blades are then introduced with their foils is reworked, and
   foils are placed in the groove, between the blades and the rotor, at least in the area where the upstream face or downstream face has been ground.

2. A method according to claim 1, wherein:
   said face is ground on at least the main portion of its circumference which has the recessed marks,
   and foils are placed in the groove, between all the blades and the rotor.

3. A method according to claim 1, wherein said face which has the recessed marks and which is ground belongs to a low-pressure compressor drum.

4. A method according to claim 1, wherein the dimensions of the foils and the groove are adapted so that:
   prior to grinding, a blade cannot be positioned in the groove and one of said foils cannot be placed between said blade and the rotor,
   whereas such positioning and placing are possible after grinding.

5. A method according to claim 1, wherein the upstream and downstream faces at the groove boundary are symmetrically ground and foils are placed in the groove, between all the blades and the rotor.

6. A method according to claim 1, wherein grinding is carried out to a depth ranging from 0.1 to 0.3 mm, smaller than or equal to the thickness of the foils.

7. An apparatus comprising:
   a blade,
   a foil; and
   a drum including a groove, wherein the blade has a root through which the blade is maintained in the groove, said groove having a radial neck for retaining the blade, the neck being defined between rims, one of said rims being interrupted by a notch for introducing the blades into the groove, with the foil comprising, on a common face:
   a central part connecting a first upright side branch and a second upright side branch, so that said central part can be positioned under the blade root and the first and second side branches being opposite an upstream face and a downstream face of said root,
   a third transverse branch, positioned upright along a portion of a first edge of the foil which extends between the first and second side branches so as to be positioned opposite of a third transverse face of said root which extends between the upstream and downstream faces of this root,
   and one or more protrusions or hooks located towards a second edge of the foil which extends between the first and second side branches, opposite the first edge, to enable:
   a sliding of said central connecting portion under the blade root, substantially up to the third transverse branch abutting against said third transverse face of the root, after the resiliently forced passage over the protrusion(s),
   and some holding of said foil in this position after a resilient return of the protrusion(s) or hook(s) opposite a fourth transverse surface of said root opposite the third transverse face.

8. The apparatus according to claim 7, wherein the first, second and third branches are each connected to the central connecting part by a fold.

9. An assembly comprising:
a rotor of a turbine engine:
   rotating about a central axis,
   and the outer periphery of which has at least one circumferential groove, wherein said rotor blades are placed and retained between an upstream face and a downstream face in an upright position at the groove boundary, with the groove having a radial neck for retaining the blades, the radial neck being defined between rims, one of said rims being interrupted by a notch for introducing the blades into the groove, with at least one of said upstream and downstream faces being ground so as to have blurred recessed marks presenting recess marks, with each blade having a root through which the blade is maintained in the groove,
the foil according to claim 7,
   and one said blade, the foil of which surrounds the root from below.

* * * * *